(12) United States Patent
Emmer et al.

(10) Patent No.: US 6,598,423 B1
(45) Date of Patent: Jul. 29, 2003

(54) SACRIFICIAL CRYOGEN GAS LIQUEFACTION SYSTEM

(75) Inventors: Claus Emmer, Prior Lake, MN (US); Thomas K. Drube, Lakeville, MN (US)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 10/046,665

(22) Filed: Jan. 22, 2002

(51) Int. Cl.$^7$ ................................................. F25J 1/00
(52) U.S. Cl. ............................................................. 62/614
(58) Field of Search .................................. 62/611, 614

(56) References Cited

U.S. PATENT DOCUMENTS 3,993,213 A * 11/1976 Burge et al. ............. 220/9 LG
5,390,499 A * 2/1995 Rhoades et al. ................ 62/9

* cited by examiner

Primary Examiner—Denise L. Esquivel
Assistant Examiner—Malik N. Drake
(74) Attorney, Agent, or Firm—Piper Rudnick

(57) ABSTRACT

A liquefaction system includes a source tank containing a supply of liquid nitrogen with a head space there above filled with nitrogen vapor. A pump transfers the liquid nitrogen to a heat exchanger. The heat exchanger also receives natural gas that has been processed in a purifier. The natural gas is liquefied by free cold from the liquid nitrogen so that liquid natural gas (LNG) is produced. The LNG travels to an LNG destination tank for storage and/or transport. The liquid nitrogen is vaporized in the heat exchanger. The resulting nitrogen gas is directed to a process system that may include, for example, cylinders for welding or other applications. Between liquefaction cycles, the purifier is regenerated by a vacuum and nitrogen vapor from the head space of the source tank. Steel shot is mixed with absorbent in the purifier so that the absorbent is cooled for increased performance.

18 Claims, 1 Drawing Sheet

SACRIFICIAL CRYOGEN GAS LIQUEFACTION SYSTEM

BACKGROUND OF THE INVENTION

The invention relates generally to systems for liquefying cryogenic gases and more particularly, to a liquefaction system that produces liquid natural gas (LNG) by vaporizing liquid nitrogen or other cryogenic liquids where the resulting gas is directed to storage cylinders for use in welding and other applications.

LNG is one alternative energy source which is domestically available, environmentally safe: and plentiful when compared to oil. As a result, the use of LNG as a fuel for vehicles such as buses, trucks and the like has greatly increased. Entire fleets of government and industrial vehicles, as well as some privately owned vehicles, have been successfully converted to LNG power.

In addition, due to its clean burning qualities and convenience, natural gas has become widely used in a variety of applications, such as heating homes. Many sources of natural gas are located in remote areas, great distances from any commercial markets for the gas. Normally a pipeline is available for transporting the natural gas to commercial markets. When pipeline transportation of natural gas is not feasible, however, it is desirable to convert the natural gas into LNG for transport and storage purposes. The primary reason for this is that the liquefaction enables the volume of natural gas to be reduced by a factor of about 600. While the capital and running costs of the systems required to liquefy the natural gas are very high, they are still much less than the costs of transporting and storing unliquefied natural gas. In addition, it is much less hazardous to transport and store LNG than unliquefied natural gas.

Natural gas, which is primarily methane and obtained in gaseous form from gas and oil fields occurring in nature, is discharged from the earth to form a natural gas feed which requires processing before it can be used commercially. Natural gas may also be obtained from landfills and bio-waste. A typical natural gas stream enters an LNG plant at a pressure of approximately 600 psig to 1000 psig and a temperature of approximately 68° F. to 104° F. The raw natural gas feed enters an LNG plant and is processed through a variety of operations in different installations to finally emerge as LNG. The LNG is subsequently stored and transported to another suitable site for use. Sometimes, this use includes re-vaporization of the LNG.

During processing, the natural gas feed is first purified to remove or reduce :the concentrations of impurities or contaminants before it is cooled to form LNG. These contaminants may include, for example, carbon dioxide, hydrogen sulfide, mercury and water. Purification reduces the chances of blockage to the equipment used in the processing and avoids other processing difficulties.

Once all of the contaminants are removed from the natural gas feed, it undergoes cooling, to produce LNG. Conventional liquefaction cools the gas to a temperature of approximately −240° F. to −260° F. at or near atmospheric pressure. The refrigeration equipment that cools the natural gas represents a significant part of an LNG plant's cost.

Many systems exist in the prior art for the liquefaction of natural gas by sequentially passing the gas at an elevated pressure through a number of cooling stages whereupon the gas is cooled to successively lower temperatures until the gas liquefies. Cooling is generally accomplished by heat exchange with one or more refrigerants that are arranged in a closed refrigeration cycle, such as the cascade cycle, the multi-component cycle, the expander cycle or the nitrogen cycle. The equipment for such cycles, however, includes compressors, expansion turbines and/or multiple special heat exchangers. As a result, the construction of such refrigeration systems is very expensive.

Alternative refrigeration systems use the vaporization of cold liquids, such as liquid nitrogen, to liquefy natural gas. Such systems often use a pressure vessel within which a recondensing coil is placed. The natural gas is directed to the pressure vessel and the coolant, liquid nitrogen for example, passes through the recondensing coil. As a result, the natural gas in the pressure vessel is liquefied and the nitrogen in the recondensing coil is vaporized. The gaseous nitrogen thus produced is used to regenerate the purification system that acts upon the natural gas feed that comes into the plant. The production of LNG in this fashion is relatively expensive in that approximately 1.6 gallons of nitrogen are used to produce one gallon of LNG.

There are a number of processes which require and consume gases such as nitrogen. An example of such a process is welding. Welding supply distributors routinely pump liquid nitrogen or argon at a high pressure through a vaporizer so that high pressure gas is produced. The high pressure gas is then directed to, and stored within, high pressure gas cylinders. The gas cylinders are then delivered to use points where welding operations are performed. The vaporizers warm the pressurized liquid flowing therethrough with ambient heat. As a result, the refrigeration or "free cold" provided by the heat absorbed in vaporizing the nitrogen or argon is wasted. Other types of cryogenic liquids are vaporized in a similar fashion to produce gases for various processes or applications and thus also result in wasted refrigeration.

Accordingly, it is an object of the present invention to provide a natural gas liquefaction system that minimizes the amount of specialized treating equipment required.

It is another object of the present invention to provide a natural gas liquefaction system that minimizes the consumption of nitrogen or other cryogenic substances in the provision of refrigeration.

It is another object of the present invention to provide a natural gas liquefaction system that is economical to construct.

It is still another object of the present invention to provide a natural gas liquefaction system that is economical to operate.

It is still another object of the present invention to provide a natural gas liquefaction system that takes advantage of the free cold consumed during the vaporization of liquid nitrogen or other cryogenic liquids during the production of gases for use in other processes or applications.

Other objects and advantages will be apparent from the remaining portion of the specification.

SUMMARY OF THE INVENTION

The present invention is directed to a liquefaction system for liquefying a cryogenic gas, preferably natural gas, with free cold from a cryogenic liquid by vaporizing the cryogenic liquid, preferably liquid nitrogen. The system includes an insulated source tank containing a supply of liquid nitrogen with a head space there above filled with nitrogen vapor. The system also includes a heat exchanger having a gas inlet, a liquid outlet, a liquid inlet and a gas outlet. A purifier containing an absorbent receives a feed of natural gas and is in communication with the gas inlet of the heat exchanger. The heat exchanger liquid inlet is in communication with the source tank. A pump is in circuit between the source tank and the liquid inlet.

An insulated destination tank is in communication with the liquid outlet of the heat exchanger and a number of cylinders, or other process system, are in communication with the gas outlet of the heat exchanger. Liquid nitrogen from the source tank flows to the heat exchanger when the pump, or other means for transferring a cryogenic liquid, is activated while natural gas from the purifier simultaneously flows to the heat exchanger. As a result, the liquid nitrogen is vaporized in the heat exchanger by heat from the natural gas and the natural gas is liquified in the heat exchanger by free cold from the liquid nitrogen. The resulting nitrogen gas flows to the cylinders and the resulting LNG flows to the destination tank. A vaporizer is selectively in circuit between the pump and the cylinders so that when liquefaction is not taking place, the vaporizer may receive cryogenic liquid from the source tank and the pump and vaporize it so that nitrogen gas flows to the cylinders. An alternative type of cryogenic liquid may be substituted for the liquid nitrogen in the source tank so that an alternative type of gas is produced and flows to the cylinders.

Regeneration of the purifier between liquefaction cycles occurs in three stages. First, a vacuum pump pulls a vacuum on the purifier. Next, a valve is opened in a line that runs from the head space of the source tank to the purifier so that nitrogen vapor from the head space of the source tank travels to the purifier so that the absorbent therein is flushed with the nitrogen vapor. Finally, an air pump flushes the absorbent of the purifier with ambient air.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
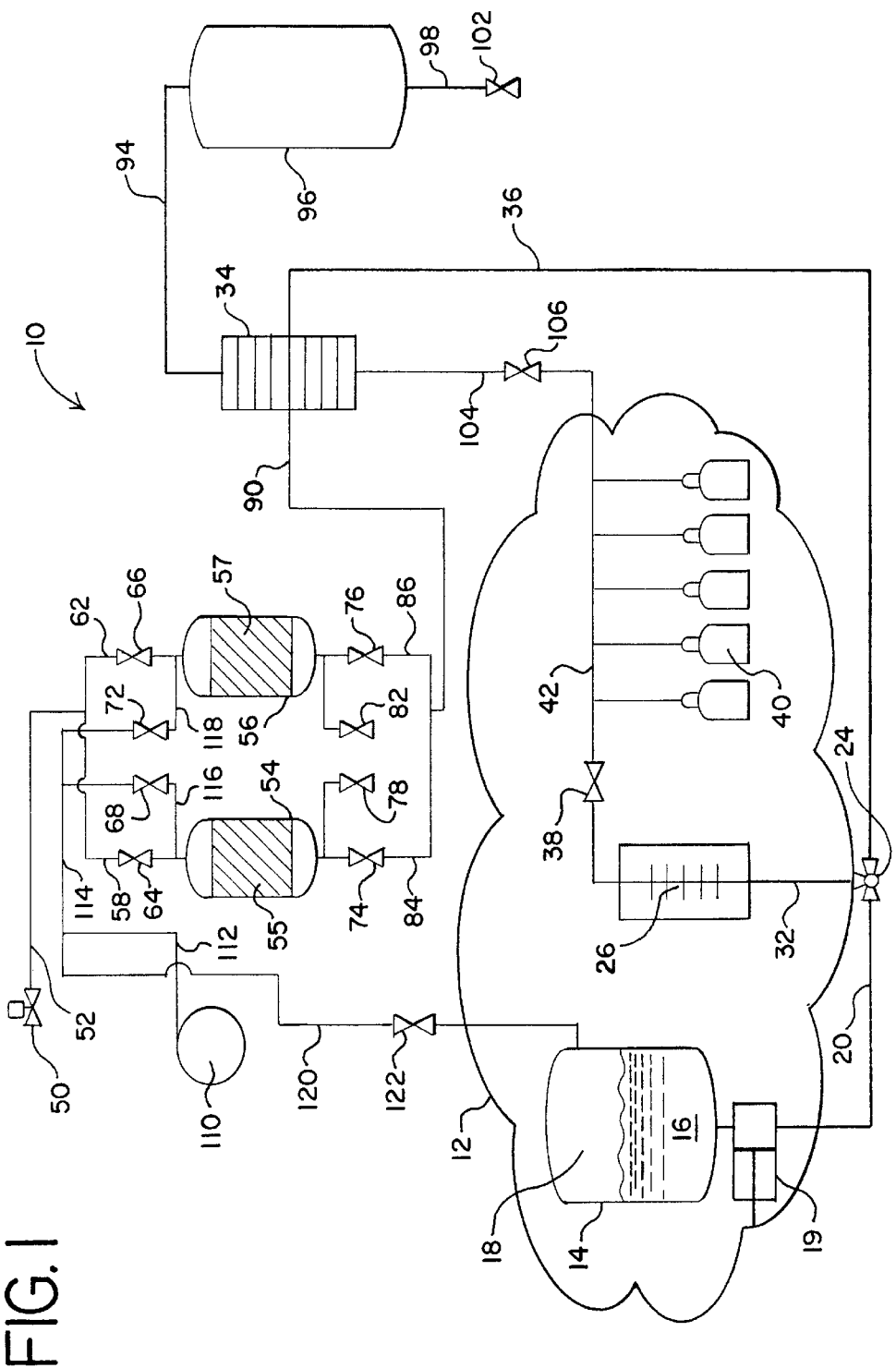
FIG. 1 is a schematic diagram of a preferred embodiment of the liquefaction system of the present invention.

A preferred embodiment of the liquefaction system of the present invention is indicated in general at 10 in FIG. 1. It should be noted that, while described below in terms of a system for liquefying natural gas and vaporizing nitrogen, with the latter being for use in welding, the system of the present invention could be used to liquefy and vaporize alternative cryogenic substances with the latter being used in a variety of process systems.

The portion of the system 10 that a typical welding supplies distributor uses to fill cylinders with pressurized nitrogen gas for use in welding applications is surrounded by line 12. This portion of the system could alternatively be used to provide pressurized gas in cylinders for other types of applications. Such applications include, for example, use of nitrogen gas in chemical processes such as blanketing, purging or inerting, among others. Alternatively, other process systems, including those featuring pressurizing and other processing equipment, could be substituted for the cylinders 40 in the portion of the system indicated at 12.

An insulated source tank 14 contains a supply of liquid nitrogen 16 with a head space 18 above. The nitrogen in tank 14 is at a temperature of around −300° F. and a pressure in the range of 10–120 psi. A high pressure cryogenic pump 19 is activated to pump liquid nitrogen from source tank 14 through line 20 to valve 24. Other means for transferring cryogenic liquid, including, but not limited to, gravity feed and other types of pumps and transferring devices known in the art, may be substituted for the pump 19.

Valve 24 may be configured to direct the liquid nitrogen to either a vaporizer 26 via line 32 or a high pressure heat exchanger 34 via heat exchanger liquid inlet line 36. Lines 20, 32 and 36 are bolded to indicate the flow of liquid therethrough. When valve 24 is configured to direct the pumped nitrogen through line 32, nitrogen gas at a temperature near ambient and pressure of approximately 2400+ psi exits vaporizer 26 and, when valve 38 is open, fills high pressure gas cylinders 40 via manifold 42.

When liquefaction of natural gas is desired, valve 24 is reconfigured so that liquid nitrogen from source tank 14 is pumped via pump 16 and line 20 through heat exchanger liquid inlet line 36 to high pressure heat exchanger 34. As a result, as will be explained below, the system 10 produces both LNG and nitrogen gas, the latter being used to fill cylinders 40.

A raw natural gas feed communicates with the system 10 through valve 50 and line 52. The incoming raw natural gas, which has a temperature near ambient and a pressure of approximately 20+ psi, travels through line 52 and into purifiers 54 and 56 through purifier inlet lines 58 and 62 when valves 64 and 66 are open. Valves 68 and 72 are closed when incoming raw natural gas is being purified. The incoming gas may optionally be compressed to 300 to 400 psi for more effective purification.

Purifiers 54 and 56 preferably contain a mixture 55 and 57 of absorbent, such as a molecular sieve, and steel shot. Shot made out of an alternative metal or other heat conductive material may be substituted for the steel shot. The absorbent works more effectively when it is cool. As will be explained below, the steel shot helps keep the absorbent cooler and evens out temperature fluctuations in the purifiers 54 and 56. As the raw natural gas flows through the purifiers, gases such as carbon dioxide and contaminants such as moisture are absorbed. The purified natural gas exits the purifiers 54 and 56 through open valves 74 and 76. As with valves 68 and 72, valves 78 and 82 are closed when the raw natural gas is being purified.

The purified natural gas travels to high pressure heat exchanger 34 via purifier outlet lines 84 and 86 and heat exchanger gas inlet line 90. As described above, liquid nitrogen also enters the high pressure heat exchanger through liquid inlet line 36. The much colder liquid nitrogen cools the natural gas in the high pressure heat exchanger 34 so that liquefaction of the natural gas occurs and LNG is produced. The liquefaction thus is performed using free cold from the liquid nitrogen that would otherwise be wasted if the liquid nitrogen was merely vaporized with an ambient heat exchanger.

The LNG exits the heat exchanger through heat exchanger liquid outlet line 94 and travels to an insulated LNG destination tank 96 for storage. Line 94 is bolded to indicate the flow of liquid therethrough. LNG may be dispensed from destination tank 96 through dispensing line 98 when dispensing valve 102 is opened. LNG destination tank 96 may be constructed as a stationary tank or as a mobile tank that may be disconnected from the system 10 after being refilled and transported to another site.

The heat absorbed by the liquid nitrogen in high pressure heat exchanger 34, as the free cold of the liquid nitrogen liquefies the natural gas, vaporizes the nitrogen so that warmed and pressurized nitrogen gas is produced. This nitrogen gas exits the high pressure heat exchanger 34 through heat exchanger gas outlet line 104 and refills cylinders 40 through manifold 42 when valve 106 is open.

Table 1 below illustrates the LNG and natural gas production capabilities of the system 10 when high pressure pump 19 is operating at 4 gallons per minute (gpm) for various liquid nitrogen and natural gas inlet pressures for heat exchanger 34.

TABLE 1

| | | | |
|---|---|---|---|
| Liquid $N_2$ Heat Exchanger Inlet Pressure, psig | 3000 | 2200 | 2200 |
| Natural Gas Heat Exchanger Inlet Pressure, psig | 150 | 150 | 300 |
| $N_2$ Gas Heat Exchanger Outlet Temperature, °F. | −63 | −52 | −13 |
| LNG Make, gpm | 2.545 | 2.847 | 3.231 |

A number of high pressure, counter flow heat exchangers that are suitable for use as heat exchanger 34 are commercially available.

After the liquefaction cycle described above, the absorbent in the purifiers 54 and 56, and the absorbent therein, will contain a mixture of natural gas, moisture, carbon dioxide and possibly other contaminants. The purifiers thus must be regenerated by removing these substances between liquefaction cycles. As will now be described, the regeneration of purifiers 54 and 56 is performed in three stages.

For the sake of safety, a vacuum is pumped on the purifiers during the first stage of regeneration to prevent a hazardous (explosive) mixture of natural gas and air forming during a latter stage of the regeneration process. This is accomplished via vacuum pump 110 and lines 112 and 114. More specifically, valves 64, 66, 74 and 76 are closed. Valves 68 and 72 are opened while vent valves 78 and 82 remain closed. Vacuum pump 110 is then activated so that a vacuum is pulled on purifiers 54and 56 through lines 112, 114, 116 and 118. As a result, the natural gas remaining from the previous liquefaction is removed from purifiers 54 and 56. This evacuation also regenerates the absorbent by removing impurities.

Given that natural gas is composed primarily of methane, a small quantity of methane may remain in the absorbent of the purifiers after the vacuum is pulled. This remaining methane cannot be flushed from the purifiers with air due to, as stated above, potential explosion hazards. In response to this issue, during the second stage of regeneration, the system 10 uses nitrogen gas to flush the impurity traces from the purifiers. It should be noted that other inert gases may be substituted for nitrogen to perform this task. A line 120, having a valve 122 positioned therein, leads from the head space 18 of nitrogen tank 14 to line 114. After vacuum pump 110 is shut off, vent valves 78 and 82 and valve 122 are opened. Valves 68 and 72 remain open. As a result, pressurized nitrogen gas flows through the purifiers 54 and 56. The trace methane formerly trapped within the absorbent exits the purifiers through vent valves 78 and 82. After approximately thirty seconds valve 122 is closed. The evacuation cycle may then be repeated.

During the above stages of the regeneration cycle, the steel shot in the purifiers 54 and 56 is cooled by the nitrogen gas. As a result, the cooled steel shot provides refrigeration to the surrounding absorbent after the regeneration cycle is completed and during the liquefaction cycle. Because the absorbent remains cooler during purification of the incoming natural gas stream, the purifiers absorb contaminants more effectively throughout the liquefaction cycle. The steel shot thus evens out temperature fluctuations of the absorbent so that there is not a large drop off in purifier performance near the end of the liquefaction cycle due to excessively warmed absorbent.

In addition to taking advantage of the free cold provided by systems that vaporize liquid nitrogen, or other cryogenic liquids, the system of the present invention may be retrofitted to existing gas producing systems. For example, the system 10 of FIG. 1 was constructed by adding the air and vacuum pumps, purifiers, heat exchanger, LNG storage tank and associated piping and valves to the basic system enclosed by line 12. By taking incorporating components of an existing system, the system of the present invention is cheaper to construct than an LNG plant that is constructed from scratch.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for liquefying a cryogenic gas using free cold from a cryogenic liquid, where the free cold would otherwise be wasted when the cryogenic liquid is vaporized, comprising:
   a. an insulated source tank containing a supply of the cryogenic liquid;
   b. a heat exchanger having a gas inlet, a liquid outlet, a liquid inlet and a gas outlet where the gas inlet is adapted to receive a feed of the cryogenic gas and the liquid inlet is in communication with the source tank;
   c. means for transferring cryogenic liquid in circuit between said source tank and the liquid inlet of said heat exchanger;
   d. an insulated destination tank in communication with the liquid outlet of said heat exchanger;
   e. a process system in communication with the gas outlet of said heat exchanger, wherein the process system includes one or more cylinders; and
   f. a vaporizer selectively in circuit between said source tank and said process system, said vaporizer selectively receiving cryogenic liquid from said source tank and vaporizing it so that a resulting gas flows to the process system,
      whereby cryogenic liquid from said source tank flows to said heat exchanger when said means for transferring cryogenic liquid is activated and cryogenic gas from the feed flows to said heat exchanger so that the cryogenic liquid is vaporized in the heat exchanger by heat from the cryogenic gas and the cryogenic gas is liquified in the heat exchanger by the free cold from the cryogenic liquid and a resulting vaporized cryogen flows to the process system and a resulting liquefied cryogenic gas flows to the destination tank.

2. The system of claim 1 wherein said means for transferring cryogenic liquid is a pump.

3. The system of claim 1 further comprising a manifold in communication with the gas outlet of the heat exchanger so that multiple cylinders may be filled with gas from the heat exchanger.

4. The system of claim 1 wherein the cryogenic gas is natural gas.

5. The system of claim 4 wherein the cryogenic liquid is nitrogen.

6. The system of claim 4 wherein the cryogenic liquid is argon.

7. The system of claim 1 wherein said destination tank is mobile.

8. The system of claim 1 wherein said destination tank is stationary.

9. The system of claim 8 wherein said destination tank includes a dispensing line and a dispensing valve.

10. A method for liquefying a cryogenic gas with free cold from vaporizing a cryogenic liquid comprising the steps of:
   a. providing a heat exchanger, a purifier having an absorbent wherein the purifier is adapted to receive the feed of cryogenic gas to be liquified, a destination tank and a process system;
   b. purifying the cryogenic gas in the purifier;
   c. directing the cryogenic gas to the heat exchanger;
   d. transferring the cryogenic liquid to the heat exchanger;
   e. warming the cryogenic liquid in the heat exchanger with heat from the cryogenic gas so that the cryogenic liquid is vaporized into a resulting gas and the cryogenic gas is liquefied with the free cold into a resulting liquid;
   f. filling the destination tank with the resulting liquid; and
   g. directing the resulting gas to the process system.

11. The method of claim 10 wherein the process system includes one or more cylinders.

12. A system for liquefying a cryogenic gas using free cold from a cryogenic liquid, where the free cold would otherwise be wasted when the cryogenic liquid is vaporized, comprising:
   a. an insulated source tank containing a supply of the cryogenic liquid;
   b. a heat exchanger having a gas inlet, a liquid outlet, a liquid inlet and a gas outlet where the gas inlet is adapted to receive a feed of the cryogenic gas and the liquid inlet is in communication with the source tank;
   c. means for transferring cryogenic liquid in circuit between said source tank and the liquid inlet of said heat exchanger;
   d. an insulated destination tank in communication with the liquid outlet of said heat exchanger;
   e. a process system in communication with the gas outlet of said heat exchanger; and
   f. a purifier in communication with the gas inlet of the heat exchanger, said purifier containing an absorbent and adapted to receive the feed of the cryogenic gas that is to be liquefied;
   whereby cryogenic liquid from said source tank flows to said heat exchanger when said means for transferring cryogenic liquid is activated and cryogenic gas from the feed flows to said heat exchanger so that the cryogenic liquid is vaporized in the heat exchanger by heat from the cryogenic gas and the cryogenic gas is liquified in the heat exchanger by the free cold from the cryogenic liquid and a resulting vaporized cryogen flows to the process system and a resulting liquefied cryogenic gas flows to the destination tank.

13. The system of claim 12 further comprising a vacuum pump selectively in communication with the purifier, said vacuum pump pulling a vacuum on the purifier when activated.

14. The system of claim 12 wherein said source tank includes a head space filled with a cryogenic vapor and further comprising:
   g. a line running from the head space of the source tank to the purifier; and
   h. a valve positioned in said line so that when said valve is open, cryogenic vapor from the head space of the source tank travels to said purifier so that the absorbent therein is flushed with the cryogenic vapor.

15. The system of claim 14 wherein the absorbent of said purifier is mixed with shot constructed of a heat absorbing material that is cooled by the cryogenic vapor from the head space of the source tank.

16. The system of claim 15 wherein said shot is made of steel.

17. A method for liquefying a cryogenic gas with free cold from vaporizing a cryogenic liquid comprising the steps of:
   a. providing a heat exchanger, a purifier, a destination tank and a process system;
   b. purifying the cryogenic gas in the purifier;
   c. directing the cryogenic gas to the heat exchanger;
   d. transferring the cryogenic liquid that is provided in a source tank with a head space containing cryogenic vapor to the heat exchanger;
   e. warming the cryogenic liquid in the heat exchanger with heat from the cryogenic gas so that the cryogenic liquid is vaporized into a resulting gas and the cryogenic gas is liquefied with the free cold into a resulting liquid;
   f. filling the destination tank with the resulting liquid;
   g. directing the resulting gas to the process system; and
   h. flushing the purifier with the cryogenic vapor from the head space of the source tank.

18. A method for liquefying a cryogenic gas with free cold from vaporizing a cryogenic liquid comprising the steps of:
   a. providing a heat exchanger, a purifier, a destination tank and a process system;
   b. purifying the cryogenic gas in the purifier;
   c. directing the cryogenic gas to the heat exchanger;
   d. transferring the cryogenic liquid to the heat exchanger;
   e. warming the cryogenic liquid in the heat exchanger with heat from the cryogenic gas so that the cryogenic liquid is vaporized into a resulting gas and the cryogenic gas is liquefied with the free cold into a resulting liquid;
   f. filling the destination tank with the resulting liquid;
   g. directing the resulting gas to the process system; and
   h. pulling a vacuum on the purifier.

* * * * *